UNITED STATES PATENT OFFICE.

HENRY F. STOWELL, OF ROCHESTER, NEW YORK.

OPTICAL DEVICE FOR VIEWING MOVING PICTURES.

1,236,229.

Specification of Letters Patent.

Patented Aug. 7, 1917.

Application filed September 24, 1914. Serial No. 863,356.

*To all whom it may concern:*

Be it known that I, HENRY F. STOWELL, of Rochester, in the county of Monroe and State of New York, have invented certain new and useful Improvements in Optical Devices for Viewing Moving Pictures; and I do hereby declare the following to be a full, clear, and exact description of the same, reference being had to the accompanying drawings, forming a part of this specification, and to the reference-numerals marked thereon.

My present invention relates to optics and it has for its object to provide a simple, cheap and serviceable device that may be worn before the eyes while viewing moving pictures for the purpose of reducing the flicker incident to the rapidly changing views. The intention is to cut off most of the marginal rays that would ordinarily enter the eye and by so reducing the illumination to give greater definition to the image and at the same time relieve the strain upon the eye. A further object of the invention is to produce an article of this character that may be manufactured in large quantities at an insignificant cost whereby it is rendered suitable for gratuitous distribution in moving picture theaters. To these and other ends the invention resides in certain improvements and combinations of parts all as will be more fully described hereinafter, the novel features being pointed out in the claims at the end of the specification.

In the drawings.

Similar reference numerals throughout the several figures indicate the same parts.

In the practice of my invention, I make use of the stenopaic hole or slit, the effect of which is to exclude the marginal rays of light coming from each illuminated point of an object and entering the eye so that the amount of light is lessened in all its meridians in the same way that a diaphragm is used on a camera lens to give better definition with a longer exposure. Most eyes are either hypermetropic or myopic. In far-sighted and near-sighted eyes, parallel rays of light such as those emanating from a moving picture screen and perceived by an audience at the usual minimum distance, do not come to a focus upon the retina, the eye being in a condition of rest, but form small circles on it and what is true of one point of light is true of all. The circles overlap each other and cause blurring of the outlines of objects. The smaller the aperture through which the light enters the eye, the smaller the circles of diffusion with consequent sharpness of vision, though the objects looked at appear slightly darker.

The effect of the stenopaic slit as distinguished from the circular opening is to limit the passage of light rays to one meridian so that looking at moving pictures through it, the pictures are seen brighter than through the stenopaic hole since less light is excluded. At the central spot of the retina situated at the posterior axis of the eye, vision is most acute, while toward the periphery of the retina, its sensitiveness diminishes both as to form and color of objects and in other respects. It would seem, however, that retinal sensitiveness to moving objects is increased at its periphery which may be regarded as a provision to guard against the impact of moving bodies. The intensity of a retinal impression depends for one factor upon the number of elements impressed and the elimination of many of the retinal elements lessens the perception of movement and hence the absence of flicker when pictures are viewed through a norraw aperture is accounted for.

Figure 1:
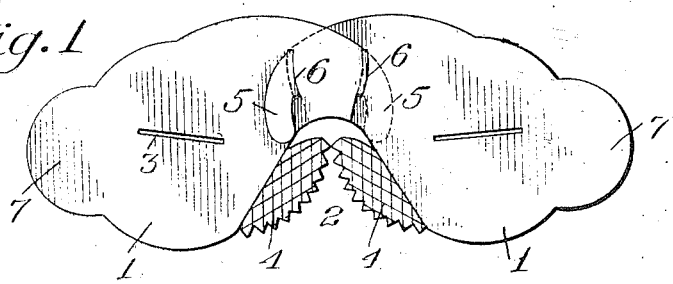
Figure 1 is a plan view of an optical device constructed in accordance with and illustrating one embodiment of my invention.
Figure 2:
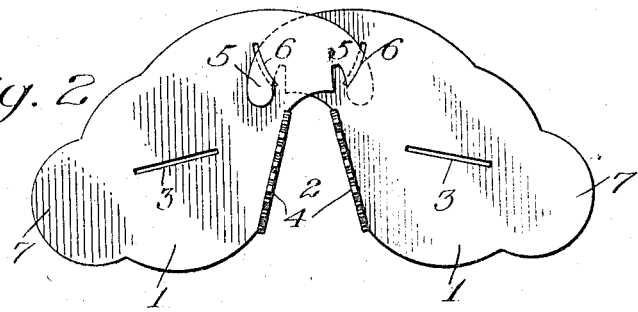
Fig. 2 is a similar view of the same device adjusted to a different position.

At any rate, the results are verified by practice and both the aperture and the slit may be utilized in the practice of my invention though I prefer the latter, particularly when combined with certain features of construction as will hereinafter appear, the present invention consisting in a particular construction of double eye-piece wherein the principle of the stenopaic opening may be utilized. Referring first to Figs. 1 and 2, 1—1 indicates the eye-pieces which are preferably made of relatively heavy or stiff black paper or cardboard. They are separated by a space 2 adapted to accommodate the nose of a wearer in the manner of ordinary eyeglasses and each is provided centrally with a horizontal slit 3. These slits are in substantial alinement so as to present themselves before the pupils of the eyes and are preferably about a twentieth of an inch in width. Integral flaps 4 are turned transversely to the plane of the eye-pieces on opposite sides of the space 2 to rest upon the nose and these may be corrugated or roughened, as shown, to insure a clinging grip.

In this preferred form of the device, the eye-pieces are made separate and joined by an adjustable bridging connection which permits the nose engaging portions 4 to be adjusted toward and from each other so that they may rest securely on the nose and still present the openings at the proper elevation. To this end, each eye-piece is formed with a curved tongue 5 having a slot 6 at its base. The tongue of one is inserted in the slot of the other and slides therein with a rocking or rotary motion providing an approximate distant center for the desired swinging movement of the nose grips. The curved character of the tongues prevents their total disengagement, however, with ordinary manipulation.

As the nose grips are so adjusted, the eye-pieces, of course, move bodily with them toward and from each other to some extent, but by utilizing the slot rather than the round opening, the change in pupilary distance is compensated for and the vision is not greatly disturbed.

The enlargements 7 at the sides of the eye-pieces act as light shields and also provide finger-pieces.

Figure 3:
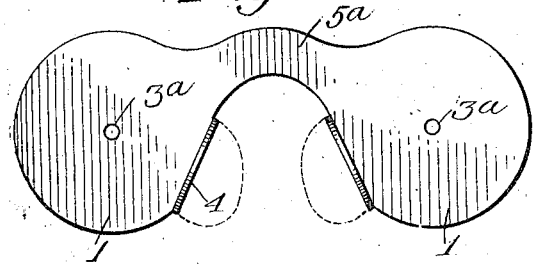
Figs. 3, 4 and 5 are respectively plan views of modified structures.

In Fig. 3, a one-piece construction is shown having an integral bridge 5ª and employing a round aperture 3ª instead of the slit 3.

Figure 4:
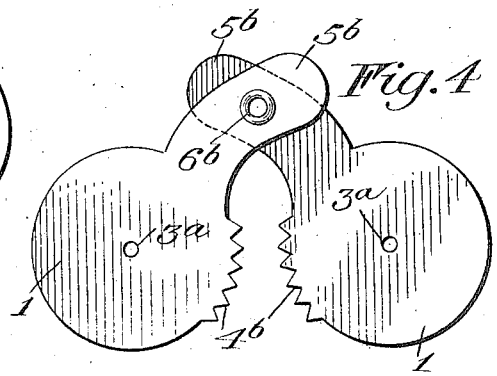

In Fig. 4, bridging tongues 5ᵇ are connected by a definite pivot 6ᵇ to swing the nose grips 4ᵇ toward and from each other. In this construction, these nose grips are formed by integral teeth or serrations in the plane of the eye-pieces. Either the apertures 3ª as shown, or slits similar to Fig. 1 may be employed.

Figure 5:
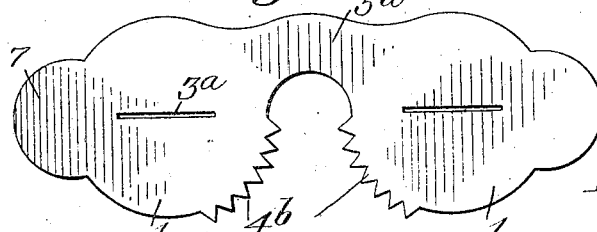

Fig. 5 shows a combination of the general form of slotted eye-piece shown in Fig. 1 with the integral bridge of Fig. 3 and the specific nose grips of Fig. 4.

I claim as my invention:

1. A non-flicker device for viewing moving pictures comprising a pair of eyepieces having restricted sight apertures therein, and composed of sheet material, said eyepieces being separated by a space adapted to accommodate the nose of a wearer and provided with corrugated integral projecting flaps on their adjacent edges forming roughened nose gripping portions bent outwardly from the plane of the eyepieces.

2. A non-flicker device for viewing moving pictures comprising a pair of eyepieces having restricted sight apertures therein and composed of sheet material, said eyepieces being separated by a space adapted to accommodate the nose of a wearer and each provided with a tongue and an adjacent slot, the tongue of one eyepiece slidably engaging the slot of the other to form an adjustable bridging connection over the nose.

3. A non-flicker device for viewing moving pictures comprising a pair of eyepieces having restricted sight apertures therein and composed of sheet material, said eyepieces being separated by a space adapted to accommodate the nose of a wearer, and each provided with a curved tongue and an adjacent slot, the tongue of one eyepiece slidably engaging the slot of the other with a rotary movement to form an adjustable bridging connection over the nose.

4. A non-flicker device for viewing moving pictures comprising a pair of eyepieces having substantially alined narrow slots therein and separated by a space adapted to accommodate the nose of a wearer, the said eyepieces being provided with nose gripping portions on their adjacent edges and with a slidably adjustable non-resilient bridging connection.

HENRY F. STOWELL.

Witnesses:
RUSSELL B. GRIFFITH,
WALTER B. PAYNE.